F. MEYER & W. H. CALDBECK.
COMBINED HASP FASTENER AND HANDLE BEARING.
APPLICATION FILED FEB. 5, 1908.
929,774.
Patented Aug. 3, 1909.
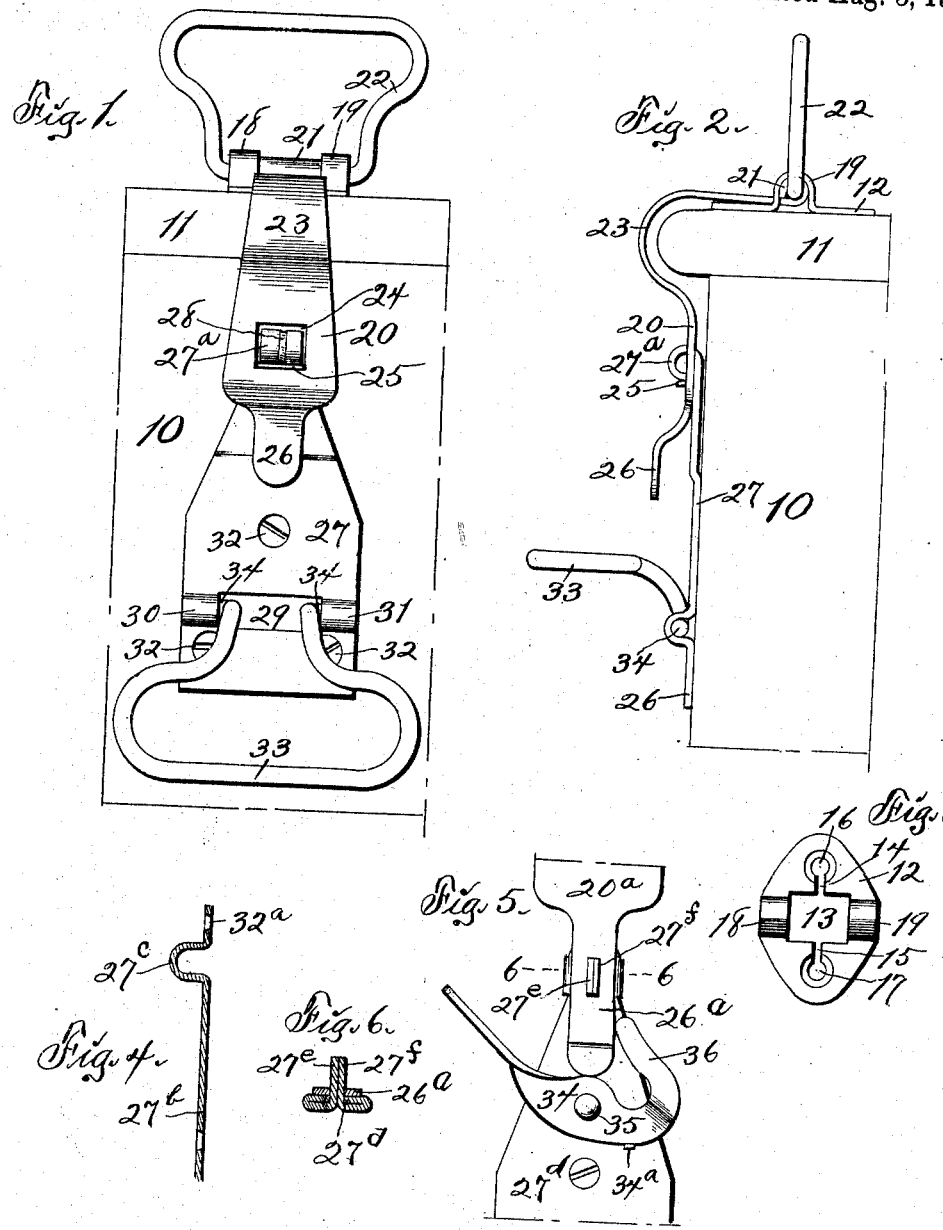

UNITED STATES PATENT OFFICE.

FRED MEYER AND WENDELL H. CALDBECK, OF PERRY, IOWA, ASSIGNORS, BY MESNE ASSIGNMENTS, TO WAGNER MANUFACTURING COMPANY, OF CEDAR FALLS, IOWA, A CORPORATION OF IOWA.

COMBINED HASP-FASTENER AND HANDLE-BEARING.

No. 929,774.     Specification of Letters Patent.     Patented Aug. 3, 1909.

Application filed February 5, 1908. Serial No. 414,437.

*To all whom it may concern:*

Be it known that we, FRED MEYER and WENDELL H. CALDBECK, both citizens of the United States, residing at Perry, in the county of Dallas and State of Iowa, have invented a new and useful Combined Hasp-Fastener and Handle-Bearing, of which the following is a specification.

The object of this invention is to provide an improved construction for hasp locks.

A further object of this invention is to provide an improved construction for combining hasp locks with handle supports or bearings.

A further object of this invention is to provide an improved stamped article adapted to serve as a hasp lock and connect a lid to a body, also adapted to serve as a bearing and support for connecting a handle to the body, and also serving as a bearing and support for connecting a handle to the lid.

Our invention consists in the construction, arrangement and combination of elements hereinafter set forth, pointed out in our claims and illustrated by the accompanying drawing, in which—

Figure 1 is a face view of the complete device, one of the handles raised as required for use, and the other handle depending as in non-use. Fig. 2 is a side elevation of the elements shown in Fig. 1, both handles raised as required for use. Fig. 3 is a detail plan of one of the elements shown in Figs. 1 and 2. Fig. 4 is a vertical section of a modified form of one of the elements shown in Figs. 1 and 2. Fig. 5 is a front elevation of a modified form of some of the elements shown in Figs. 1 and 2. Fig. 6 is a cross-section on the indicated line 6—6 of Fig. 5.

In the construction and mounting of the device as shown, the numeral 10 designates a body such as the tub of a washing-machine, and the numeral 11 designates a lid such as is employed to close the tub or body 10. A clip 12 is provided and is formed of a single piece of sheet metal by stamping. The clip 12 is generally of oval form and is provided with a rectangular aperture 13 in its central portion and slots 14, 15 leading from said opening to screw-holes 16, 17 formed in end portions of the clip. The holes 16, 17 are adapted to admit screws whereby the clip may be mounted on the lid or cover 11. Half bearings 18, 19 are formed in and arched upwardly at the central portion of the clip 12 and are approximately semi-circular in cross-section. The half bearings 18, 19 are in alinement and on opposite sides of the opening 13 of the clip.

A hasp 20 is formed of a single piece of sheet metal by stamping. One end portion 21 of the hasp 20 is of greater width than the body of the hasp and is rolled into a cylinder with its end portions projecting laterally of the margins of said body. A handle 22 is journaled in the rolled end portion of the hasp 20. The hasp 20 is mounted in the clip by longitudinal travel through the opening 13, slots 14, 15, and screw-holes 16, until the narrow portion or neck of the hasp enters the opening 13, at which time the clip is twisted on the neck into the position shown in Figs. 1 and 2, and then said clip is secured to the lid or cover 11. When the clip 12 is secured to the lid or cover 11, the half bearings 18, 19 thereof serve as journal boxes for the projecting end portions of the cylinder 21, and said cylinder serves as a journal box for the handle 22. The hasp 20 is arched forwardly at 23 and again recedes and has its body in a plane parallel with the front of the body or tub 10. An opening 24 is formed in the central portion of the body 20, and a flange or lip 25 is formed on and projects outwardly at the lower margin of said opening. A tongue 26 is formed on and flared outwardly from the lower end portion of the hasp. An eye plate 27 is formed of a single piece of sheet metal by stamping. One end portion 27$^a$ of the eye plate 27 is reduced in width and is rolled longitudinally into cylindrical form and projects forwardly from the plane of the eye plate to form an eye. A circumferential bead 28 is formed in the central portion of the cylinder or eye 27$^a$. The cylinder or eye 27$^a$ is of such size that it will pass through the opening 24 in the body of the hasp 20. An opening 29 is formed in the body of the eye plate 27, and half bearings 30, 31 are formed in and arched forwardly from said eye plate in alinement on opposite sides of said opening. The eye-plate 27 is provided with screw-holes adapted to admit screws 32 whereby it may be attached to the body or tub 10. A handle 33 is provided with pivots or end portions 34 extending outwardly in opposite directions and adapted to be embraced and journaled by the half-bearings 30, 31. The eye plate 27 is mounted on the body in such relation to the clip 12 on the lid that the hasp member 20 will spring over the cylinder or eye 27ª and cause the lip 25 to engage the lower surface of said cylinder and frictionally connect the hasp to the staple body. Further connection may be made by inserting securing means, such as a pin or peg, through the cylinder 27ª in front of the hasp body 20. It is the function of the tongue 26 to provide a convenient handle whereby manual force may be applied to engage and disengage the hasp 20 with or from the staple member.

In Fig. 4 we show an eye plate 27ᵇ with a semi-cylindrical boss or staple 27ᶜ adjacent its upper end, adapted to be engaged by the hasp, and in the extremity of the eye plate, beyond said boss or staple, a screw-hole 32ª is provided. In this construction the eye plate is mounted rigidly on the support and the staple boss adapted to engage the hasp is rigid and unyielding.

In Figs. 5 and 6 we show a hasp member 20ª formed with a tongue 26ª longitudinally slotted and turned outwardly at its lower end. We show an eye plate 27ᵈ formed with wings projecting laterally from the reduced end portion, which wings are bent rearwardly and thence forwardly through an opening in said reduced end portion and project in front of the same parallel with each other, the projecting portions of said wings being designated by the numerals 27ᵉ, 27ᶠ. In this construction we provide a hook lever 34 fulcrumed on a stud 35 seated in the central portion of the eye plate. One end portion 36 of the hook lever is offset outwardly and is adapted to engage with and in front of the tongue 26ª and hold said tongue to its seat against the eye plate. The opposite end portion of the hook lever 34 is twisted into a plane at right angles to the body and serves as a handle or thumb-piece whereby said hook may be oscillated on the stud 35.

We claim as our invention—

1. As an improved article of manufacture, a clip, a hasp journaled in said clip, a handle journaled in said hasp, an eye plate and inter-engaging means on said hasp and eye plate.

2. As an improved article of manufacture, a clip formed with a central aperture and half bearings on opposite sides thereof, a hasp formed with cylindrical pivots at one end adapted to journal in said half bearings, a handle journaled in said hasp, an eye plate, and inter-engaging means on said hasp and eye plate.

3. As an improved article of manufacture, a sheet metal clip formed with spaced half-bearings, a sheet metal hasp formed with tubular pivots at one end journaled in said half-bearings, a handle journaled in said tubular pivots, and an eye-plate formed with an integral cylindrical staple, said hasp formed with an opening adapted to embrace said staple.

4. As an improved article of manufacture, a clip formed with a central opening, and screw-holes laterally removed therefrom, and slots connecting said central opening and screw-holes, said clip also formed with integral half bearings intermediate of its ends and communicating with said central opening.

5. As an improved article of manufacture, a sheet-metal hasp formed with cylindrical tubular pivots at one end and projecting laterally therefrom and also formed with an eye or opening and a lip or flange adjacent said eye or opening, the end portion of the hasp opposite the pivots curved outwardly, the tubular pivots adapted to receive and pivotally support a handle.

Signed at Perry, Iowa, this 14 day of January, 1908.

FRED MEYER.
WENDELL H. CALDBECK.

Witnesses:
B. O. MALLEY,
GEO. H. FRENCH.